United States Patent
Liang (10) Patent No.: US 11,172,023 B2
(45) Date of Patent: Nov. 9, 2021

(54) DATA SYNCHRONIZATION METHOD AND SYSTEM

(71) Applicant: WANGSU SCIENCE & TECHNOLOGY CO., LTD., Shanghai (CN)

(72) Inventor: Shiping Liang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 797 days.

(21) Appl. No.: 15/777,575

(22) PCT Filed: Nov. 14, 2017

(86) PCT No.: PCT/CN2017/110955
§ 371 (c)(1),
(2) Date: May 18, 2018

(87) PCT Pub. No.: WO2019/061720
PCT Pub. Date: Apr. 4, 2019

(65) Prior Publication Data
US 2021/0176310 A1    Jun. 10, 2021

(30) Foreign Application Priority Data
Sep. 29, 2017 (CN) .......................... 201710911767.3

(51) Int. Cl.
*G06F 16/27* (2019.01)
*H04L 12/24* (2006.01)
(Continued)

(52) U.S. Cl.
CPC ........ *H04L 67/1095* (2013.01); *G06F 9/4881* (2013.01); *G06F 16/27* (2019.01);
(Continued)

(58) Field of Classification Search
None
See application file for complete search history.

(56) References Cited

U.S. PATENT DOCUMENTS 8,812,849 B1    8/2014    Ubl
2008/0270486 A1    10/2008    Hind et al.
(Continued)

FOREIGN PATENT DOCUMENTS

| CN | 103095769 A | 5/2013 |
|---|---|---|
| CN | 103685583 A | 3/2014 |

(Continued)

OTHER PUBLICATIONS

The European Patent Office (EPO) The Extended European Search Report for 17879651.2 (PCT/CN2017/110955) dated Feb. 18, 2019 10 Pages.

(Continued)

*Primary Examiner* — Joshua Joo (57) ABSTRACT

A method for data synchronization, includes: acquiring, by a target terminal, a locally pre-stored service domain name of a target server room, and transmitting, by the target terminal, a service request to the target server room through the service domain name; executing, by the target server room, a service operation corresponding to the service request, updating, by the target server room, a first database, and generating, by the target server room, a data change message; sending, by the target server room, the data change message to an associated server room of the target server room; and performing, by the associated server room, data synchronization based on the received data change message.

16 Claims, 4 Drawing Sheets

(51) Int. Cl.
  *H04L 29/08*   (2006.01)
  *G06F 9/48*    (2006.01)
  *H04L 29/12*   (2006.01)

(52) U.S. Cl.
  CPC ...... *H04L 41/0668* (2013.01); *H04L 61/1511* (2013.01); *H04L 61/2007* (2013.01); *H04L 67/1029* (2013.01); *H04L 67/32* (2013.01)

(56) References Cited

U.S. PATENT DOCUMENTS

| | | | |
|---|---|---|---|
| 2010/0125649 | A1 | 5/2010 | Day et al. |
| 2013/0332597 | A1* | 12/2013 | Kumar ................. H04L 67/1029 709/224 |
| 2014/0108662 | A1 | 4/2014 | Anaya et al. |
| 2014/0289305 | A1 | 9/2014 | Singh et al. |
| 2015/0163161 | A1* | 6/2015 | Arikatla ................. H04L 47/726 709/226 |
| 2016/0055034 | A1* | 2/2016 | Park ........................ G06F 21/44 718/104 |
| 2016/0188427 | A1* | 6/2016 | Chandrashekar ... G06F 11/0709 714/4.11 |
| 2018/0213031 | A1* | 7/2018 | Kannan ................. H04L 67/1002 |
| 2018/0288141 | A1* | 10/2018 | Mo ...................... H04L 67/2842 |
| 2019/0044945 | A1* | 2/2019 | Kundu ................... H04W 12/08 |
| 2020/0125580 | A1* | 4/2020 | Shao ......................... G06F 16/27 |

FOREIGN PATENT DOCUMENTS

| | | | | |
|---|---|---|---|---|
| CN | 103731451 | A | 4/2014 | |
| CN | 104202375 | A | 12/2014 | |
| CN | 105472035 | A | 4/2016 | |
| CN | 105635287 | A | 6/2016 | |
| CN | 105872121 | A | 8/2016 | |
| CN | 106101291 | A | 11/2016 | |
| WO | WO-2016074323 | A1 * | 5/2016 | ......... H04L 67/1023 |
| WO | WO-2017124938 | A1 * | 7/2017 | ......... G06F 16/2358 |

OTHER PUBLICATIONS

Pinder, Steve, "Synchronous vs asynchronous replication: Order of events during data writes", Apr. 25, 2011 XP055551292, Retrieved from the Internet:URL:https://www.computerweekly.com/answer/Synchronous-vs-asynchronous-replication-Order-of-events-during-data-writes, [retrieved on Feb. 4, 2019], pp. 1-6.

The China National Intelleectual Property Administration (CNIPA) The China Search Report for 201710814923.4 dated Dec. 24, 2019 15 Pages.

The China National Intelleectual Property Administration (CNIPA) The China Search Report for 201710911767.3 dated Apr. 28, 2019 13 Pages.

* cited by examiner

DATA SYNCHRONIZATION METHOD AND SYSTEM

CROSS-REFERENCES TO RELATED APPLICATIONS

This application is a national phase entry under 35 U.S.C § 371 of International Application No. PCT/CN2017/110955 filed on Nov. 14, 2017, which claims priority of Chinese Patent Application No. 201710911767.3, filed with the State Intellectual Property Office of P. R. China on Sep. 29, 2017, the entire contents of all of which are incorporated herein by reference.

FIELD OF THE DISCLOSURE

The present disclosure generally relates to the field of data synchronization technology and, more particularly, relates to a data synchronization method and system.

BACKGROUND

With the continuous development of the Internet technology, the amount of data in the network service has dramatically increased. Conventional single-server systems face many problems such as difficulty in operation and maintenance, low efficiency, low reliability, and difficulty in expansion under a large number of scenarios. More and more companies have performed functional modularization and distributed microservice architecture evolution for servers, and even adopted a cross server room-based cluster service architecture for improved service reliability.

Currently, the cross server room architectures mostly use a deployment mode including a primary and a standby server rooms to provide external services. Under normal operations, the primary server room provides external services, while the standby server room is in the standby mode. The primary server room periodically synchronizes service data with the standby server room. When the primary server room fails and cannot continue providing external services, the standby server room is put into operation to continue to provide related services.

In the process of implementing the present disclosure, the inventors found that the existing technology has at least the following problems:

The standby server room can provide external services only after its data is synchronized with the primary server room. In this way, even if the standby server room has the ability to independently provide external services, it will not provide services externally when the primary server room is operating normally. Therefore, the utilization rate for resources processing by the server rooms in the cross server room architecture is relatively low.

BRIEF SUMMARY OF THE DISCLOSURE

To solve the problems in the existing technology, a data synchronization method and system are provided in the embodiments of the present disclosure. The technical solutions are as follows:

In a first aspect, a method for data synchronization is provided. The method includes:

acquiring, by a target terminal, a locally pre-stored service domain name of a target server room, and transmitting, by the target terminal, a service request to the target server room through the service domain name;

executing, by the target server room, a service operation corresponding to the service request, updating, by the target server room, a first database, and generating, by the target server room, a data change message;

sending, by the target server room, the data change message to an associated server room of the target server room; and performing, by the associated server room, data synchronization based on the received data change message.

Optionally, before acquiring, by the target terminal, the service domain name of the target server room, the method further includes:

sending, by the target terminal, a domain name acquisition request to a load scheduling cluster, wherein the domain name acquisition request includes a terminal identifier of the target terminal;

determining, by the load scheduling cluster, among externally serving virtual IP addresses (VIPs) in all server rooms, the number of healthy VIPs;

determining, by the load scheduling cluster, a target VIP based on the terminal identifier and the number of healthy VIPs, and sending, by the load scheduling cluster, a server domain name of a target server room corresponding to the target VIP to the target terminal; and receiving and storing, by the target terminal, the service domain name of the target server room sent by the load scheduling cluster.

Optionally, after transmitting, by the target terminal, the service request to the target server room through the service domain name, the method further includes:

if a failure of the service request transmission is detected, sending, by the target terminal, a domain name acquisition request including a terminal identifier of the target terminal to the load scheduling cluster;

determining, by the load scheduling cluster, the number of healthy VIPs among externally serving VIPs in all server rooms;

determining, by the load scheduling cluster, a new VIP based on the terminal identifier and the number of healthy VIPs, and sending, by the load scheduling cluster, a service domain name of a new server room corresponding to the new VIP to the target terminal; and receiving and storing, by the target terminal, the service domain name of the new server room sent by the load scheduling cluster.

Optionally, the executing, by the target server room, the service operation corresponding to the service request, updating, by the target server room, the first database, and generating, by the target server room, the data change message includes:

calling, by the target server room, a service processing thread to start processing the service request, and monitoring, by the target server room, whether there is a database operation; and if there is no database operation, feeding back, by the target server room, a service processing result to the target terminal, and if there is a database operation, determining, by the target server room, whether the database operation involves a data change.

Optionally, if no data change is involved, the target server room performs the database operation in the first database, continues processing the service request based on a result of the database operation, and feeds back the service processing result to the target terminal.

Optionally, if a data change is involved, the target server room performs a data change operation in the first database, continues processing the service request based on a result of the data change, feeds back the service processing result to the target terminal, and generates the data change message based on the data change operation and stores the data change message in a preset message queue.

Optionally, the performing, by the associated server room, data synchronization based on the received data change message includes:

receiving, by the associated server room, the data change message sent by the target server room, and determining, by the associated server room, a terminal identifier of a target terminal corresponding to the data change message;

determining, by the associated server room, a target data change thread corresponding to the terminal identifier based on the terminal identifier through a consistent hashing algorithm; and calling, by the associated server room, the target data change thread to perform data synchronization in a second database based on the data change message.

In a second aspect, a system for data synchronization is provided. The system comprises a target terminal, a target server room, and an associated server room of the target server room, where:

the target terminal is configured to acquire a locally pre-stored service domain name of the target server room, and transmit a service request to the target server room through the service domain name;

the target server room is configured to execute a service operation corresponding to the service request, update a first database, and generate a data change message;

the target server room is further configured to send the data change message to the associated server room; and the associated server room is configured to perform data synchronization based on the received data change message.

Optionally, the system further comprises a load scheduling cluster, where:

the target terminal is further configured to send a domain name acquisition request to the load scheduling cluster, wherein the domain name acquisition request includes a terminal identifier of the target terminal;

the load scheduling cluster is configured to determine the number of healthy VIPs among externally serving VIPs in all server rooms;

the load scheduling cluster is further configured to determine a target VIP based on the terminal identifier and the number of the health VIPs, and send a service domain name of a target server room corresponding to the target VIP to the target terminal; and the target terminal is further configured to receive and store the service domain name of the target server room sent by the load scheduling cluster.

Optionally, the target terminal is further configured to send a domain name acquisition request including a terminal identifier of the target terminal to a load scheduling cluster if a failure of the service request transmission is detected.

Optionally, the load scheduling cluster is further configured to determine the number of healthy VIPs among externally serving VIPs in all server rooms;

the load scheduling cluster is further configured to determine a new VIP based on the terminal identifier and the number of healthy VIPs, and send a service domain name of a new server room corresponding to the new VIP to the target terminal; and the target terminal is further configured to receive and store the service domain name of the new server room sent by the load scheduling cluster.

Optionally, the target server room is specifically configured to:

call a service processing thread to start processing the service request, and monitor whether there is a database operation; and if there is no database operation, feed back a service processing result to the target terminal, and if there is a database operation, determine whether the database operation involves a data change.

Optionally, if no data change is involved, the database operation is performed in the first database, the service request continues to be processed based on a result of the database operation, and the service processing result is fed back to the target terminal.

Optionally, if a data change is involved, a data change operation is performed in the first database, the service request continues to be processed based on a result of the data change, the service processing result is fed back to the target terminal, and the data change message is generated based on the data change operation and the data change message is stored in a preset message queue.

Optionally, the associated server room is specifically configured to:

receive the data change message sent by the target server room, and determine a terminal identifier of a target terminal corresponding to the data change message;

determine a target data change thread corresponding to the terminal identifier based on the terminal identifier through a consistent hashing algorithm; and call the target data change thread to perform data synchronization in a second database based on the data change message.

The technical solutions provided by the embodiments of the present disclosure give rise to the following beneficial effects:

In the embodiments of the present disclosure, a target terminal acquires a locally pre-stored service domain name of a target server room, and transmits a service request to the target server room through the service domain name; the target server room executes a service operation corresponding to the service request, updates a first database, and generates a data change message; the target server room sends the data change message to an associated server room of the target server room; and the associated server room performs data synchronization based on the received data change message. In this way, when a data change occurs in the database of a certain server room, a corresponding data change message can be quickly generated so that data synchronization can be performed in time in the database of the associated server room based on the data change message. Accordingly, the feasibility of dual active of the server room and the associated server room is ensured, and the utilization rate of resources processing of the server rooms within a cross the server room architecture is improved. Moreover, the database of the associated server room may perform data synchronization in time based on the data change message, so that the data with the same terminal identifier can be processed in the same thread, and the order of data processing in the same terminal is performed based on the order of the data requested by the terminal, to avoid abnormal service behavior caused by the out-of-order data processing.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Figure 1:
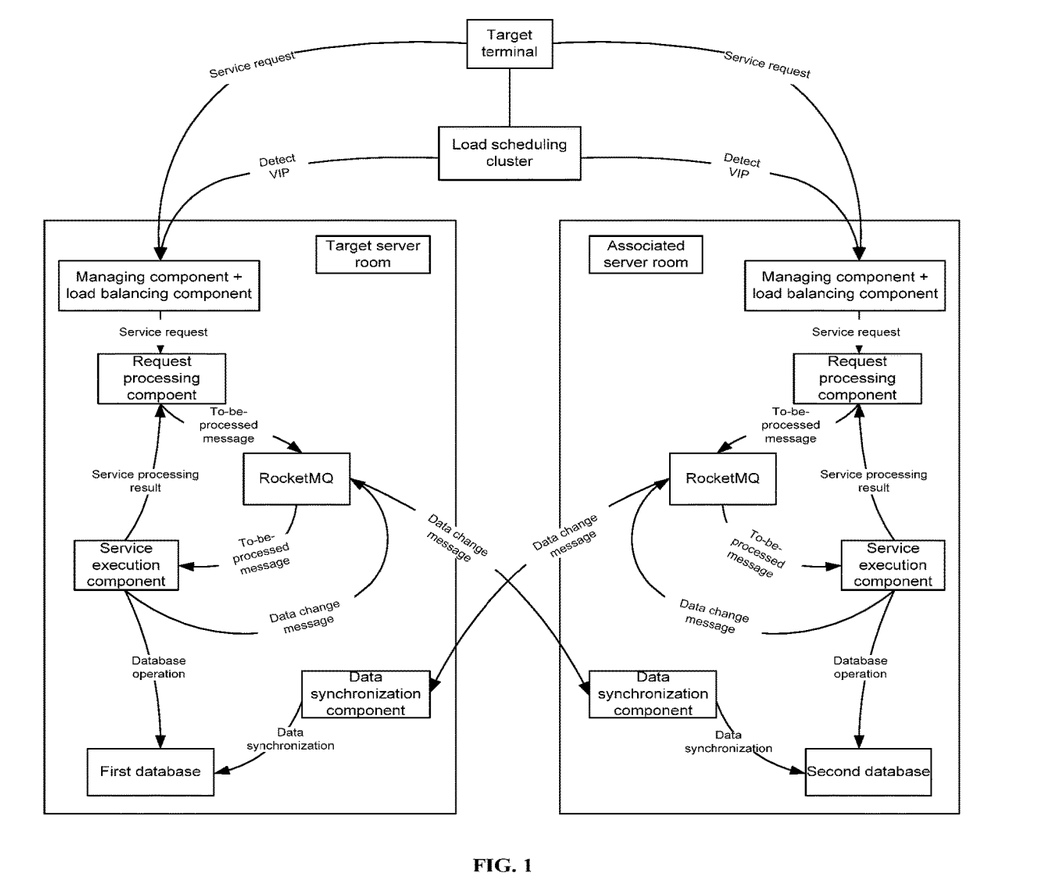
FIG. 1 is a schematic diagram of a specific framework of a data synchronization system consistent with one embodiment of the present disclosure.

Embodiments of the present disclosure provide a method for data synchronization. The method may be implemented using a user terminal, a load scheduling cluster, and multiple server rooms, where the load scheduling cluster and the multiple server rooms belong to a service terminal of a network service. The load scheduling cluster may comprise network devices deployed in multiple server rooms, and be used to manage service operations in the multiple server rooms. For example, the load scheduling cluster may detect whether the VIP (Virtual IP Address) corresponding to the service domain name of each server room is active, or allocate service requests sent by different terminals among the multiple server rooms. A server room may comprise multiple functional components, mainly including a managing component (may be Keepalived software, mainly used to detect the running statuses of various functional components and bind with externally serving VIPs in the server room), a load balancing component, a request processing component, a service execution component, a database, and a data synchronization component, etc. Each functional component may comprise multiple servers, where each server may be used to execute some or all the functions of the network service. Each server room has at least one associated server room, and the functions and the supported services of a server room are the same as its associated server room(s). A server room and its associated server room(s) may provide the same external network service at the same time. When a server room fails, the network service in this server room can be transferred to its associated server room for continued execution. A specific framework may be shown in FIG. 1. A server in the above functional components may include a processor, a memory, and a transceiver, where the processor may be configured to perform data synchronization in the following processes, the memory may be configured to store data required and generated in the following processes, and the transceiver may be configured to receive and transmit the relevant data in the following processes.

Figure 2:
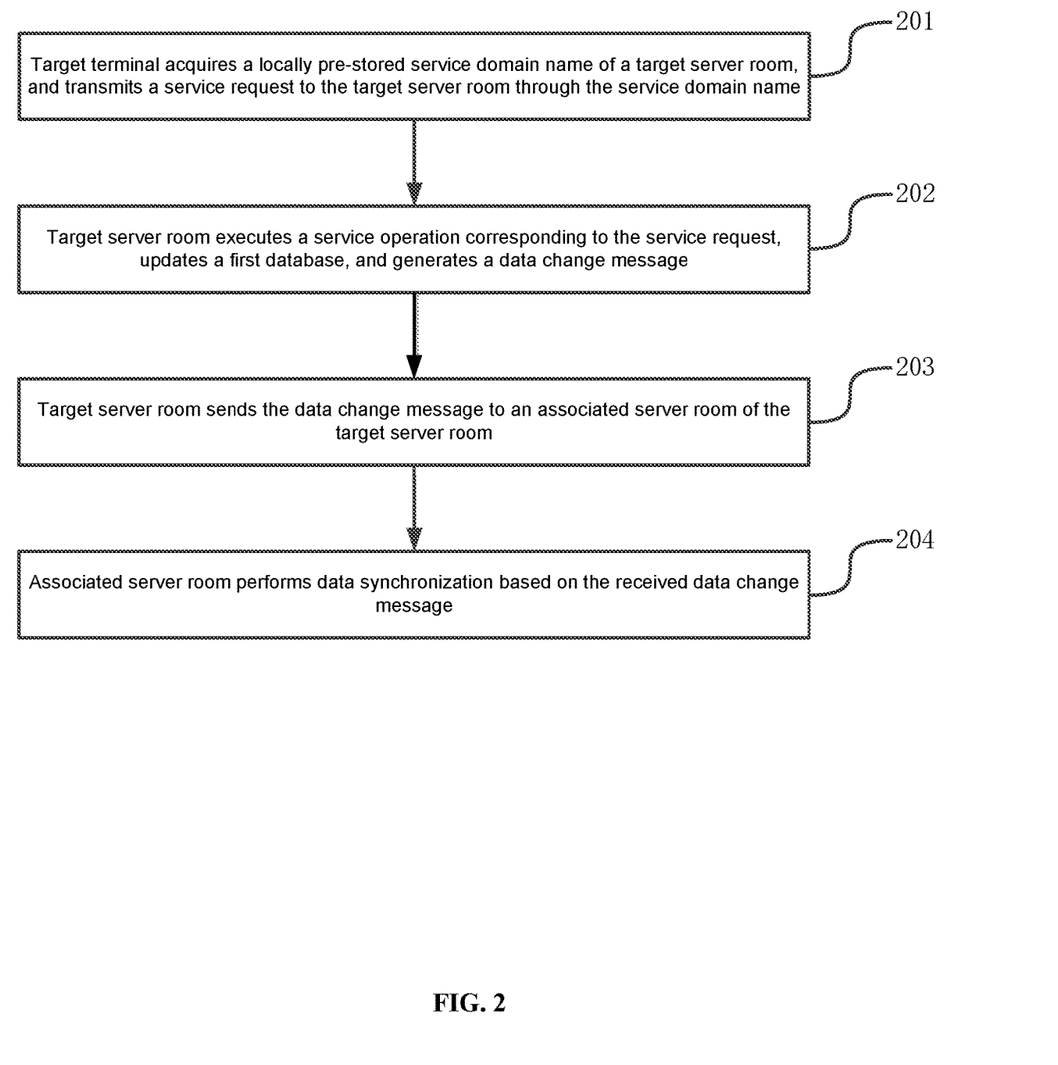
FIG. 2 is a flowchart of a data synchronization method consistent with one embodiment of the present disclosure.

The processing flow shown in FIG. 2 is illustrated in detail hereinafter with reference to specific embodiments of the present disclosure, which may be as follows:

Step 201, a target terminal acquires a locally pre-stored service domain name of a target server room and transmits a service request to the target server room through the service domain name.

In the implementation, when a user wants to accomplish a certain network service through a terminal (e.g., a target terminal), the user may send a corresponding service request to a provider of the network service through the target terminal. Specifically, the target terminal may first acquire a locally pre-stored service domain name of a server room (i.e., a target server room) that supports the corresponding service, establish a communication link with the target server room through the service domain name, and send the corresponding service request to the target server room through the established communication link. It is to be understood that, under certain circumstances, the communication link between the target terminal and the target server room may have been established in advance, and thus only a process of the service request transmission is required here.

Optionally, before Step 201, the terminal may acquire the service domain name of the target server room from a load scheduling cluster, and the corresponding process may be as follows: the target terminal sends a domain name acquisition request to a load scheduling cluster, where the domain name acquisition request includes a terminal identifier of the target terminal; the load scheduling cluster determines the number of healthy VIPs among externally serving VIPs in all server rooms; the load scheduling cluster determines, for example, through a consistent hashing algorithm, a target VIP based on the terminal identifier and the number of healthy VIPs, and sends a service domain name of a target server room corresponding to the target VIP to the target terminal; and the target terminal receives and stores the service domain name of the target server room sent by the load scheduling cluster.

In the implementation, if the target terminal has not previously transmitted any service request to the target server room, before sending the present service request, it may first send a domain name acquisition request including a terminal identifier of the target terminal to the load scheduling cluster of the network service provider to acquire a service domain name of the server room that provides the related service. The load scheduling cluster may receive the domain name acquisition request sent by the target terminal and extract the terminal identifier of the target terminal included in the domain name acquisition request. Further, the load scheduling cluster may detect the operating statuses of VIPs offering external services in each server room, and determine the number of healthy VIPs in VIPs that offer external services in all the server rooms. Further, the load scheduling cluster may determine a target VIP based on the terminal identifier of the target terminal and the determined number of healthy VIPs, for example, through a consistent hashing algorithm. To understand the consistent hashing algorithm, a simple example is provided here. For example, if the number of healthy VIPs is 10, a hash ring may be set up based on the 10 healthy VIPs, where each healthy VIP is a node on the hash ring. Terminal identifier and VIP mapping rules may be arbitrarily set. For example, a terminal having a terminal identifier with an ending number of 1 corresponds to VIP1, a terminal with an ending number of 2 corresponds to VIP2, and so on. In this way, a target VIP corresponding to the target terminal may be determined. It is to be understood that the above description is merely for illustrative purpose and shall not be constructed as limiting specific processes of the consistent hashing algorithm. Further, the load scheduling cluster may send the service domain name of the target server room corresponding to the target VIP to the target terminal. After receiving the above service domain name, the target terminal may store the service domain name locally.

Optionally, if the transmission of the service request fails, the terminal may acquire the service domain name of a new server room from the load scheduling cluster, and the corresponding process may be as follows: if a failure of the service request transmission is detected, the target terminal sends a domain name acquisition request including a terminal identifier of the target terminal to the load scheduling cluster; the load scheduling cluster determines the number of healthy VIPs among externally serving VIPs in all server rooms; the load scheduling cluster determines a new VIP based on the terminal identifier and the number of healthy VIPs, for example, through a consistent hashing algorithm, and sends a service domain name of a new server room corresponding to the new VIP to the target terminal; and the target terminal receives and stores the service domain name of the new server room sent by the load scheduling cluster.

In the implementation, after transmitting the service request to the target server room, the target terminal may detect whether the service request is successfully transmitted. Here, a variety of detection methods exist, which may vary depending on different communication mechanisms. For example, one communication mechanism specifies that a server room needs to feed back a reception acknowledgment message when receiving a service request sent by the terminal. Then, after transmitting the service request to the target server room, the target terminal may determine that the transmission of the service request fails if it has not received the reception acknowledgment message fed back by the target server room within a predefined period. It may then be assumed that the running of the service domain name stored in the target terminal is abnormal, and the target terminal may acquire a service domain name again from the load scheduling cluster. Specifically, the target terminal may send a domain name acquisition request including the terminal identifier of the target terminal to the load scheduling cluster. The load scheduling cluster may extract the terminal identifier after receiving the domain name acquisition request. Further, the load scheduling cluster may detect the operating statuses of VIPs offering external services in each server room, and determine the number of healthy VIPs in externally serving VIPs in all server rooms. Further, the load scheduling cluster may determine the new VIP based on the terminal identifier of the target terminal and the determined number of healthy VIPs, for example, through a consistent hashing algorithm. Thus, the load scheduling cluster may send the service domain name of the new server room corresponding to the new VIP to the target terminal. After receiving the above-mentioned service domain name, the target terminal may store the service domain name locally, and delete the locally pre-stored service domain name of the target server room.

Figure 3:
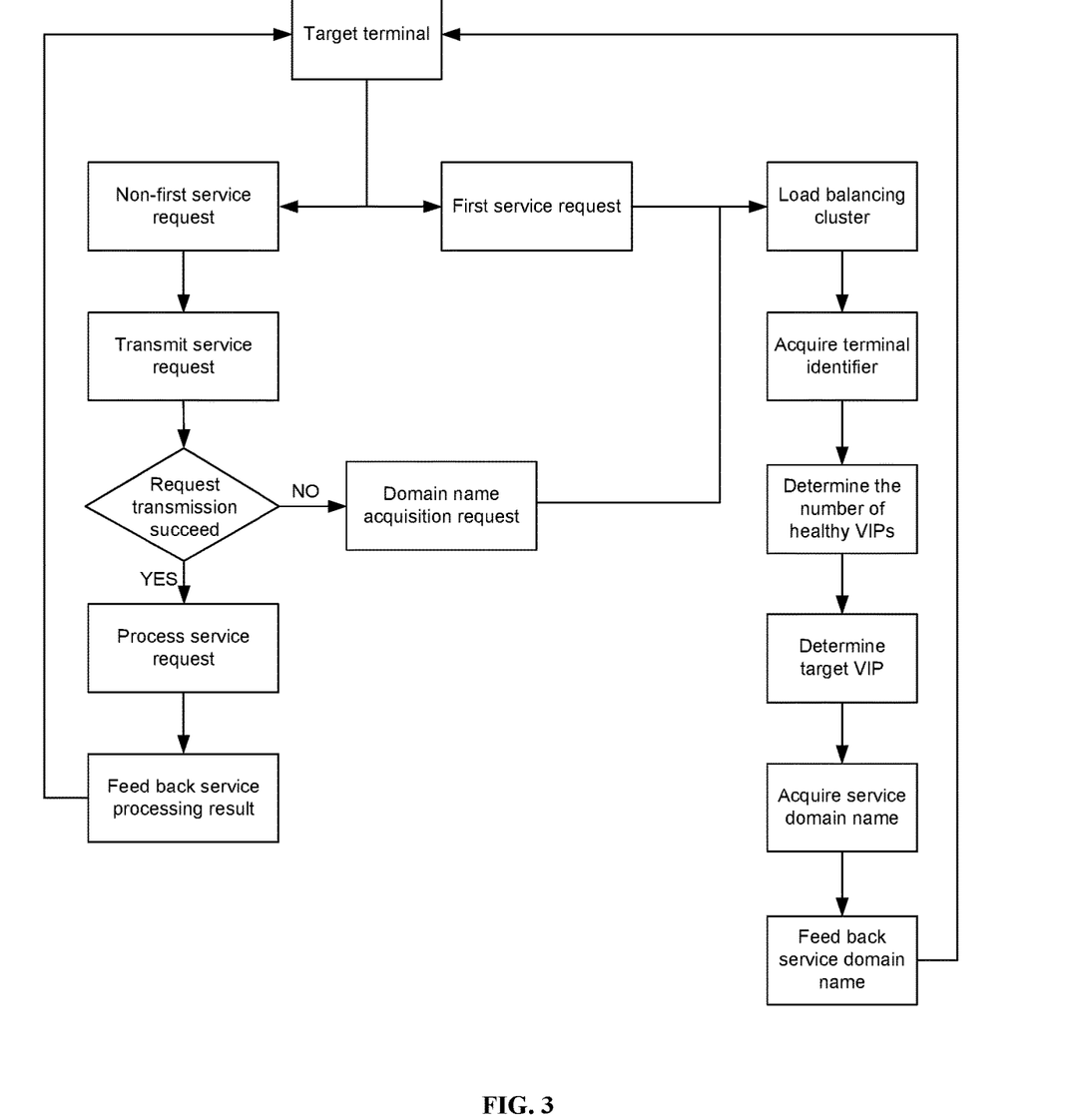
FIG. 3 is a schematic diagram of a process for determining a service domain name consistent with one embodiment of the present disclosure.

The above-described process of determining the service domain name of the target server room by the load scheduling cluster may refer to FIG. 3.

Step 202: the target server room executes a service operation corresponding to the service request, updates a first database, and generate a data change message.

The first database is a database used by the target server room to record service data.

In the implementation, after the target terminal sends the service request to the target server room, the target server room may receive the corresponding service request. Afterward, the load balancing component of the target server room may select a request processing component for processing the service request from multiple request processing components based on a predefined configuration, and send the service request to the above-described request processing component. Here, the load balancing component may be specifically implemented using the software "HaProxy". After acquiring the service request, the request processing component may perform permission and format verification on the service request, decrypt the data of the service request, generate a to-be-processed message related to the service request, and send the to-be-processed message to a message queue. Further, the service execution component may pull the above to-be-processed message from the message queue, and perform the corresponding service operation based on the to-be-processed message. In the process of executing the service operation, the service execution component may monitor the operations in which the database is involved. If there is a data change operation, such as adding, modifying, deleting, etc., the local database (i.e., the first database) may be updated based on the data change operation. At the same time, a data change message corresponding to the data change operation may also be generated. After the service operation is completed, the service execution component may feed back the execution result to the request processing component, and the request processing component may perform data encryption on the execution result, and send the encrypted execution result back to the target terminal.

Optionally, when processing a service request, the server room may perform different processing depending on whether the service request includes a data change operation. Correspondingly, the execution of Step 202 may be as follows: the target server room calls a service processing thread to start processing the service request, and monitors whether there is a database operation; if there is no database operation, the target server room feeds back a service processing result to the target terminal, and if there is a database operation, the target server room determines whether the database operation involves a data change; if no data change is involved, the target server room performs the database operation in the first database, continues processing the service request based on a result of the database operation, and feeds back the service processing result to the target terminal; and if a data change is involved, the target server room performs a data change operation in the first database, continues processing the service request based on a result of the data change, feeds back the service processing result to the target terminal, generates the data change message based on the data change operation, and stores the data change message in a preset message queue.

In the implementation, after receiving the service request sent by the target terminal, the target server room may call a corresponding service processing thread to start processing the service request, and at the same time may monitor whether there is a database operation during the service execution. If no database operation has occurred till the service execution is completed, the target server room may feed back the service processing result of the service request to the target terminal. However, if a database operation occurs during the service execution, the target server room may first determine whether the database operation involves a data change. It is not difficult to understand that database operations include at least data query, copy, deletion, addition, modification, etc. While the data query and copy do not change the data in the database, data deletion, addition, and modification change the data in the database, and thus are called data change operations. If no data change is involved in the above-described process of service execution, the target server room may perform the database operation in the first database, continue processing the service request based on the result of the database operation, and feed back the service processing result to the target terminal after the processing is completed. If a data change is involved, the target server room may first perform the data change operation in the first database, continue processing the service request based on the result of the data change, and feed back the service processing result to the target terminal after the execution is completed. At the same time, the target server room may also generate a data change message based on the data change operation, and store the data change message in a preset message queue. Here, the preset message queue may use message-oriented middleware "RocketMQ", in which a message that gets into the message queue earlier will have a priority to be processed, and thus the sequence of each data change message in the "RocketMQ" may be effectively guaranteed.

Step 203, the target server room sends the data change message to the associated server room of the target server room.

In the implementation, after executing the service operation corresponding to the service request and generating the data change message, the target server room may send the data change message to the associated server room of the target server room. Specifically, the target server room may directly send the data change message to the data synchronization component of its associated server room.

Step 204, the associated server room performs data synchronization based on the received data change message.

In the implementation, the data synchronization component of the associated server room may receive the data change message sent by the target server room, and perform data synchronization based on the data change message. Here, if multiple data change operations occur when the target server room processes the service request, multiple data change messages will be generated. In this case, corresponding data change operations may be sequentially performed in the database of the associated server room based on the order of the data change messages, thereby accomplishing the synchronization of the data between the target server room and the associated server room.

Optionally, specific data synchronization performed by the associated server room may be as follows: the associated server room receives the data change message sent by the target server room, and determines a terminal identifier of a target terminal corresponding to the data change message; the associated server room determines a target data change thread corresponding to the terminal identifier based on the terminal identifier, for example, through a consistent hashing algorithm; and the associated server room calls the target data change thread to perform data synchronization in a second database based on the data change message.

In the implementation, the data synchronization component in any server room may subscribe to the data change messages in the RocketMQ (i.e., the aforementioned preset message queue) of an associated server room. Therefore, after data change messages are added into the RocketMQ in the target server room, the target server room may send the data change messages to its associated server room in the order in which the data change messages were generated. In this way, the data synchronization component of the associated server room may receive the corresponding data change messages. Accordingly, the associated server room may first determine the terminal identifiers of the target terminals corresponding to the data change messages, and then determine the target data change threads corresponding to the terminal identifiers based on the terminal identifiers, for example, through a consistent hashing algorithm. It is worth mentioning that, in order to ensure the efficiency of data synchronization, there are generally a large number of threads in a server room to synchronize data of different services at the same time. Therefore, the operation for determining the target data change threads may ensure that the data change messages corresponding to the same terminal identifier will be processed on the same data change thread, so that the sequence of the data synchronization operations in the same terminal may be guaranteed. Further, the associated server room may call the above target data change threads to perform data change operations in a database (i.e., the second database) corresponding to the associated server room based on the data change messages, thereby accomplishing the data synchronization.

Figure 4:
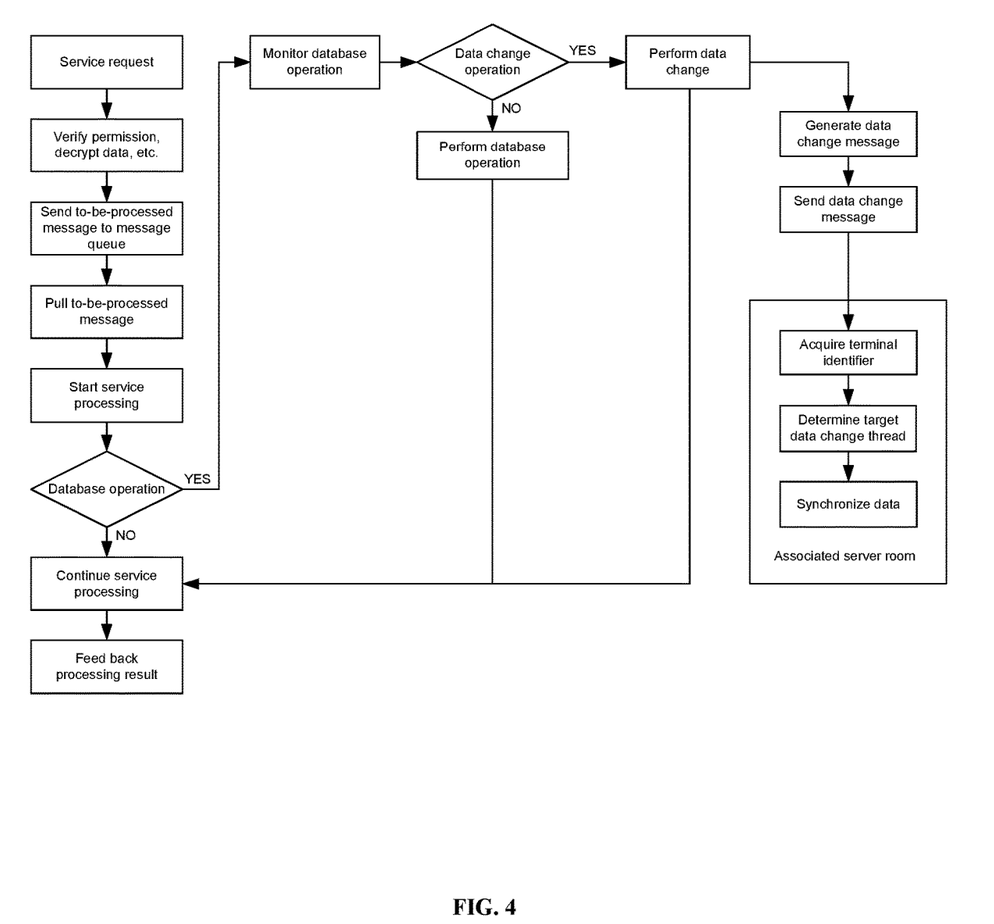
FIG. 4 is a schematic flowchart of data synchronization consistent with one embodiment of the present disclosure.

All of the above-described processes from receiving the service request in the target server room to accomplishing data synchronization in the associated server room may refer to FIG. 4.

In the embodiments of the present disclosure, a target terminal acquires a locally pre-stored service domain name of a target server room, and transmits a service request to the target server room through the service domain name; the target server room executes a service operation corresponding to the service request, updates a first database, and generates a data change message; the target server room sends the data change message to an associated server room of the target server room; and the associated server room performs data synchronization based on the received data change message. In this way, when a data change occurs in the database of a certain server room, a corresponding data change message can be quickly generated so that data synchronization can be performed in time in the database of the associated server room based on the data change message. Accordingly, the feasibility of dual active of the server room and the associated server room is ensured, and the utilization rate of resources processing of the server rooms within a cross the server room architecture is improved. Moreover, the database of the associated server room may perform data synchronization in time based on the data change message, so that the data with the same terminal identifier can be processed in the same thread, and the order of data processing in the same terminal is performed based on the order of the data requested by the terminal, to avoid abnormal service behavior caused by the out-of-order data processing.

Based on the similar technical concepts, embodiments of the present disclosure further provide a system for data synchronization. The system comprises a target terminal, a target server room, and an associated server room of the target server room, where:

the target terminal is configured to acquire a locally pre-stored service domain name of the target server room, and transmit a service request to the target server room through the service domain name;

the target server room is configured to execute a service operation corresponding to the service request, update a first database, and generate a data change message;

the target server room is further configured to send the data change message to the associated server room; and the associated server room is configured to perform data synchronization based on the received data change message.

Optionally, the system further comprises a load scheduling cluster, where:

the target terminal is further configured to send a domain name acquisition request to the load scheduling cluster, wherein the domain name acquisition request includes a terminal identifier of the target terminal;

the load scheduling cluster is configured to determine the number of healthy VIPs among externally serving VIPs in all server rooms;

the load scheduling cluster is further configured to determine a target VIP based on the terminal identifier and the number of the health VIPs, for example, through a consistent hashing algorithm, and send a service domain name of a target server room corresponding to the target VIP to the target terminal; and the target terminal is further configured to receive and store the service domain name of the target server room sent by the load scheduling cluster.

Optionally, the target terminal is further configured to send a domain name acquisition request including a terminal identifier of the target terminal to the load scheduling cluster if a failure of service request transmission is detected;

the load scheduling cluster is further configured to determine the number of healthy VIPs among externally serving VIPs in all the server rooms;

the load scheduling cluster is further configured to determine a new VIP based on the terminal identifier and the number of healthy VIPs, for example, through a consistent hashing algorithm, and send a service domain name of a new server room corresponding to the new VIP to the target terminal; and the target terminal is further configured to receive and store the service domain name of the new server room sent by the load scheduling cluster.

Optionally, the target server room is specifically configured to:

call a service processing thread to start processing the service request, and monitor whether there is a database operation;

if there is no database operation, feed back a service process result to the target terminal, and if there is a database operation, determine whether the database operation involves a data change;

if no data change is involved, perform the database operation in the first database, and continue processing the service request based on a result of the database operation, and feed back the service processing result to the target terminal; and if a data change is involved, perform a data change operation in the first database, continue processing the service request based on a result of the data change, feed back the service processing result to the target terminal, and generate the data change message based on the data change operation and store the data change message in a preset message queue.

Optionally, the associated server room is specifically configured to:

receive the data change message sent by the target server room, and determine a terminal identifier of a target terminal corresponding to the data change message;

determine a target data change thread corresponding to the terminal identifier based on the terminal identifier, for example, through a consistent hashing algorithm;

call the target data change thread to perform data synchronization in a second database based on the data change message.

The technical solutions provided by the embodiments of the present disclosure give rise to the following beneficial effects:

In the embodiments of the present disclosure, a target terminal acquires a locally pre-stored service domain name of a target server room, and transmits a service request to the target server room through the service domain name; the target server room executes a service operation corresponding to the service request, updates a first database, and generates a data change message; the target server room sends the data change message to an associated server room of the target server room; and the associated server room performs data synchronization based on the received data change message. In this way, when a data change occurs in the database of a certain server room, a corresponding data change message can be quickly generated so that data synchronization can be performed in time in the database of the associated server room based on the data change message. Accordingly, the feasibility of dual active of the server room and the associated server room is ensured, and the utilization rate of resources processing of the server rooms within a cross the server room architecture is improved. Moreover, the database of the associated server room may perform data synchronization in time based on the data change message, so that the data with the same terminal identifier can be processed in the same thread, and the order of data processing in the same terminal is performed based on the order of the data requested by the terminal, to avoid abnormal service behavior caused by the out-of-order data processing.

It is to be understood by those of ordinary skill in the art that all or part of the steps of the embodiments of the present disclosure may be implemented by hardware, or may be implemented by programs that instruct the relevant hardware, where the programs may be stored in a computer-readable storage medium, in which the storage medium may be a read-only memory, a magnetic disk, or an optical disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for data synchronization, the method comprising:

acquiring, by a target terminal, a locally pre-stored service domain name of a target server room, and transmitting, by the target terminal, a service request to the target server room through the service domain name;

executing, by the target server room, a service operation corresponding to the service request, updating, by the target server room, a first database, and generating, by the target server room, a data change message;

sending, by the target server room, the data change message to an associated server room of the target server room; and performing, by the associated server room, data synchronization based on the received data change message;

wherein performing, by the associated server room, data synchronization based on the received data change message includes:

receiving, by the associated server room, the data change message sent by the target server room, and determining, by the associated server room, a terminal identifier of the target terminal corresponding to the data change message;

determining, by the associated server room, a target data change thread corresponding to the terminal identifier based on the terminal identifier; and calling, by the associated server room, the target data change thread to perform data synchronization in a second database based on the data change message.

2. The method according to claim 1, wherein, before acquiring, by the target terminal, the service domain name of the target server room, the method further includes:

sending, by the target terminal, a domain name acquisition request to a load scheduling cluster, wherein the domain name acquisition request includes the terminal identifier of the target terminal;

determining, by the load scheduling cluster, among externally serving Virtual IP Addresses (VIPs) in all server rooms, a number of healthy VIPs;

determining, by the load scheduling cluster, a target VIP based on the terminal identifier and the number of healthy VIPs, and sending, by the load scheduling cluster, a server domain name of a target server room corresponding to the target VIP to the target terminal; and receiving and storing, by the target terminal, the service domain name of the target server room sent by the load scheduling cluster.

3. The method according to claim 1, wherein, after transmitting, by the target terminal, the service request to the target server room through the service domain name, the method further includes:

if a failure of the service request transmission is detected, sending, by the target terminal, a domain name acquisition request including the terminal identifier of the target terminal to a load scheduling cluster;

determining, by the load scheduling cluster, a number of healthy VIPs among externally serving VIPs in all server rooms;

determining, by the load scheduling cluster, a new VIP based on the terminal identifier and the number of healthy VIPs, and sending, by the load scheduling cluster, a service domain name of a new server room corresponding to the new VIP to the target terminal; and receiving and storing, by the target terminal, the service domain name of the new server room sent by the load scheduling cluster.

4. The method according to claim 1, wherein executing, by the target server room, the service operation corresponding to the service request, updating, by the target server room, the first database, and generating, by the target server room, the data change message include:

calling, by the target server room, a service processing thread to start processing the service request, and monitoring, by the target server room, whether there is a database operation; and if there is no database operation, feeding back, by the target server room, a service processing result to the target terminal, and if there is a database operation, determining, by the target server room, whether the database operation involves a data change.

5. The method according to claim 4, wherein determining, by the target server room, that the database operation involves no data changes, the method further includes:

the target server room performs the database operation in the first database, continues processing the service request based on a result of the database operation, and feeds back the service processing result to the target terminal.

6. The method according to claim 4, wherein determining, by the target server room, that the database operation involves a data change, the method further includes:

the target server room performs a data change operation in the first database, continues processing the service request based on a result of the data change, feeds back the service processing result to the target terminal, and generates the data change message based on the data change operation and stores the data change message in a preset message queue.

7. The method according to claim 1, wherein, calling, by the associated server room, the target data change thread to perform data synchronization in a second database based on the data change message include:

when the target server room processes the service request, if multiple data change operations occur and multiple data change messages is generated, performing, by the associated server room, data synchronizations in a second database based on the order of the multiple data change messages.

8. The method according to claim 2, wherein, the service request is a first service request.

9. The method according to claim 3, wherein, the service request is a non-first service request.

10. A system for data synchronization, the system comprising a target terminal, a target server room, and an associated server room of the target server room, wherein:

the target terminal is configured to acquire a locally pre-stored service domain name of the target server room and transmit a service request to the target server room through the service domain name;

the target server room is configured to execute a service operation corresponding to the service request, update a first database, and generate a data change message;

the target server room is further configured to send the data change message to the associated server room; and the associated server room is configured to perform data synchronization based on the received data change message, wherein the associated server room is specifically configured to:

receive the data change message sent by the target server room, and determine a terminal identifier of the target terminal corresponding to the data change message;

determine a target data change thread corresponding to the terminal identifier based on the terminal identifier; and call the target data change thread to perform data synchronization in a second database based on the data change message.

11. The system according to claim 10, further comprising a load scheduling cluster, wherein:

the target terminal is further configured to send a domain name acquisition request to the load scheduling cluster, wherein the domain name acquisition request includes the terminal identifier of the target terminal;

the load scheduling cluster is configured to determine a number of healthy VIPs among externally serving VIPs in all server rooms;

the load scheduling cluster is further configured to determine a target VIP based on the terminal identifier and the number of the health VIPs, and send a service domain name of a target server room corresponding to the target VIP to the target terminal; and the target terminal is further configured to receive and store the service domain name of the target server room sent by the load scheduling cluster.

12. The system according to claim 10, wherein the target terminal is further configured to send a domain name acquisition request including the terminal identifier of the target terminal to a load scheduling cluster if a failure of the service request transmission is detected.

13. The system according to claim 12, wherein:

the load scheduling cluster is further configured to determine a number of healthy VIPs among externally serving VIPs in all server rooms;

the load scheduling cluster is further configured to determine a new VIP based on the terminal identifier and the number of healthy VIPs, and send a service domain name of a new server room corresponding to the new VIP to the target terminal; and the target terminal is further configured to receive and store the service domain name of the new server room sent by the load scheduling cluster.

14. The system according to claim 10, wherein the target server room is specifically configured to:

call a service processing thread to start processing the service request, and monitor whether there is a database operation; and if there is no database operation, feed back a service processing result to the target terminal, and if there is a database operation, determine whether the database operation involves a data change.

15. The system according to claim 14, wherein, if no data change is involved, the database operation is performed in the first database, and the service request continues to be processed based on a result of the database operation, and the service processing result is fed back to the target terminal.

16. The system according to claim 14, wherein, if a data change is involved, a data change operation is performed in the first database, the service request continues to be processed based on a result of the data change, the service processing result is fed back to the target terminal, and the data change message is generated based on the data change operation and the data change message is stored in a preset message queue.

* * * * *